WILLIAM CLARK.
Improvement in Governors for Steam and other Engines.
No. 127,572. Patented June 4, 1872.

Witnesses
W. Morris Smith
Sydney E. Smith

William Clark
By his Attorney
Z. C. Robbins

2 Sheets--Sheet 2.
WILLIAM CLARK.
Improvement in Governors for Steam and other Engines.
No. 127,572. Patented June 4, 1872.
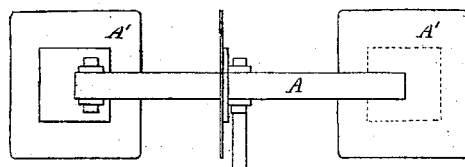
FIG. 3.
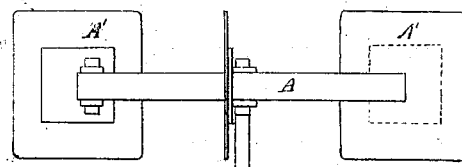
FIG. 4.
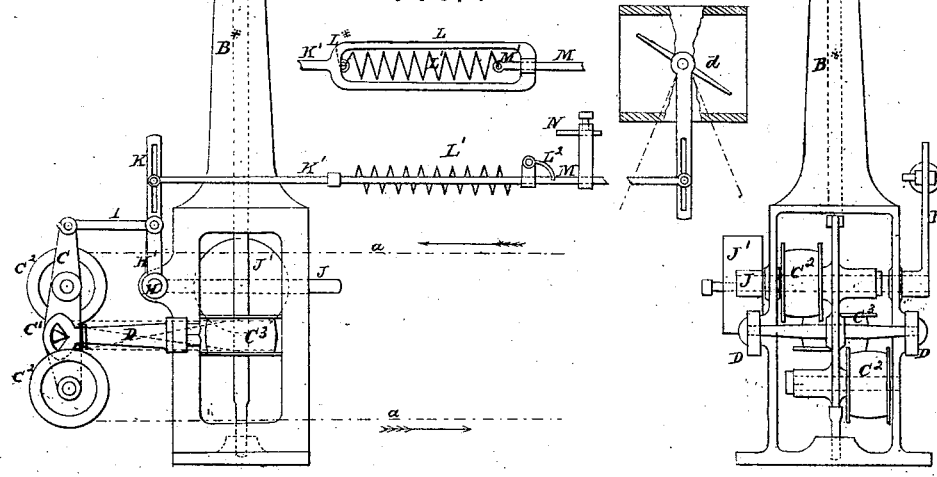
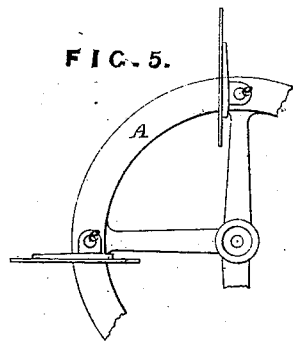
FIG. 5.
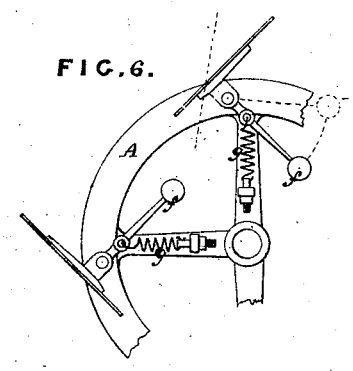
FIG. 6.
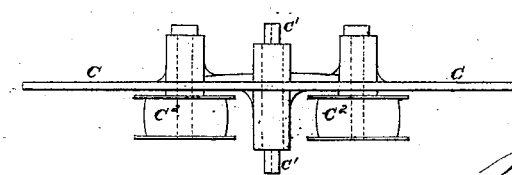
FIG. 2ª.
Witnesses
W. Morris Smith
Sydney E. Smith
William Clark
By his attorney
J. C. Robbins

UNITED STATES PATENT OFFICE.

WILLIAM CLARK, OF PLUMSTEAD, ENGLAND.

IMPROVEMENT IN GOVERNORS FOR STEAM AND OTHER ENGINES.

Specification forming part of Letters Patent No. 127,572, dated June 4, 1872.

Specification describing certain Improvements in Governors for Steam and other Engines, invented by WILLIAM CLARK, of Plumstead, Kent, England, engineer.

My invention has for its object the production of an instantaneous regulating action upon the throttle-valve of a steam or other engine by means of two combined forces operating against a third force; and relates mainly to various devices and arrangements of mechanism for causing these forces to act with the desired effect upon the throttle-valve, so that its instantaneous action in either direction shall not be impaired by friction. It also relates to the construction and application to a governor of an automatic safety-check link, whereby, if the governor is disconnected or stopped, the throttle-valve will be instantly closed; and also to appliances whereby the governor is made capable of adjustment to permit the engine to work at any required speed.

In one arrangement of my said invention I use a balance-vane wheel fixed on a shaft that runs in bearings in two brackets that support the governor. The said wheel is driven by the following peculiar arrangement of bands or belts—that is to say, a pulley is fixed on one end of the balance-wheel shaft. At a convenient distance from this pulley, on one of the brackets, I place a beam, which is supported to oscillate freely on its fulcrum. On this beam, and at equal distance from the center of the same, the driving-band is passed over the pulley on the balance-wheel shaft and over the two pulleys on the vibrating beam, and is extended to the engine-shaft. The beam is, preferably, fitted to vibrate on steel centers or knife-edges. A spring, arranged in combination with a compensating-link to equalize its force, acts at one end of the beam in opposition to the force which tends to close the valve, and the power required to keep the balance-wheel at a given velocity is first transmitted through the beam and acts on the opposite end of the same. It therefore follows that while the engine maintains a uniform speed the beam will remain at rest; but should the load on the engine be suddenly diminished, the impulse thus given to the engine will instantly destroy the equilibrium of the beam and cause it to advance, with the driving-band, against the action of the spring, partially closing the throttle-valve and checking the speed of the engine. The loop in the band on the driving side will now be shortened, while the loop on the opposite side will be lengthened to the same extent. If, on the other hand, the load on the engine is increased, the check thus given to the speed of the engine will instantly release the driving end of the beam, and the combined action of the spring and the momentum of the balance-wheel will bring down the other end of the beam and open the valve.

Thus it will be seen that in my governor the throttle-valve is opened or closed by the beam, which is so supported between the two opposing forces that it remains at rest while these forces are in equilibrium, but will act instantaneously to open or close the said valve when this equilibrium is destroyed.

In a modification of my invention I use a balance-vane wheel, as hereinbefore described, fixed on a vertical spindle, on whose lower end the driving-pulley is fixed. This spindle is supported by a small pillar or stand, with openings at the base to allow the driving-band to pass freely. On each side of the base I fix a stud or arm for supporting the vibrating beam, which is provided with belt-carrying pulleys, as above described. At a convenient distance from the center of the said beam I arrange a shaft, whereon is fixed an arm, which is connected by a small link to the end of the vibrating beam. The arm and its connections are fitted with steel centers and knife-edges or round studs. On one end of the said shaft is fixed an arm, which carries a counter-balance weight, and on the other end is an arm connected to the valve-rod. To this valve-rod I apply my improved automatic safety-check link. I prefer that the same should be placed as near to the valve as practicable. The said rod is made in two parts, on one of which the link is formed. At the outer end of this link I make a hole to receive the other part of the rod, and to allow the same to slide freely through it. A spiral or other spring is placed in the link between its inner end and the sliding part of the rod. If this spring is free it will shorten the rod by pulling the sliding part of the said rod into the link to the extent of the travel of the valve-lever, and will therefore close the said valve. The said rod is, however, kept to its proper length by means of a pawl or latch attached to the end of the link and fitted into a notch in the sliding part of the rod. The said pawl is provided with an incline or other like contrivance, which, when the governor is disconnected or stopped, comes against a stop that raises the pawl out of the notch in the rod and allows the spring to shorten the rod and close the valve. The said stop is made adjustable, and can be set in any required position. This part of my invention can be conveniently applied to any kind of governor now in use. I sometimes make the vanes of the balance-wheel compensating by means of light balls, arranged in such a manner that they will open and close the vanes according to the speed; or the said balls may be arranged to act in combination with the resistance of the atmosphere upon the vanes against the force of springs. The vanes in this arrangement must be suspended at their centers or other suitable parts, and connected by small links to a star-wheel that is fitted to turn freely on the central shaft or spindle of the governor. The said star-wheel is connected to one of the arms of the balance-wheel by a spring, which resists the combined forces acting upon the vane. The spring, therefore, through the star-wheel, controls all the vanes, and opens and closes them according to the speed of the engine. But in order to avoid the weight or friction on the joints a spring may be connected to each of the arms of the balance-wheel and also to the arms that carry the balls.

By this improved construction and arrangement of parts the action of the governor is made direct or in the line of motion, so that the instantaneous action of the valve in either direction is not prevented by friction.

Description of the Drawing.

Fig. 2$^a$ is a top view of a detached portion of the same. Figs. 3 and 4 are elevations illustrating a modification of the said governor. Fig. 4$^a$ shows a detached portion of the same. Figs. 5 and 6 are detached portions, showing other modifications of the said governor.

Like letters indicate the same parts throughout the drawing.

Figure 1:
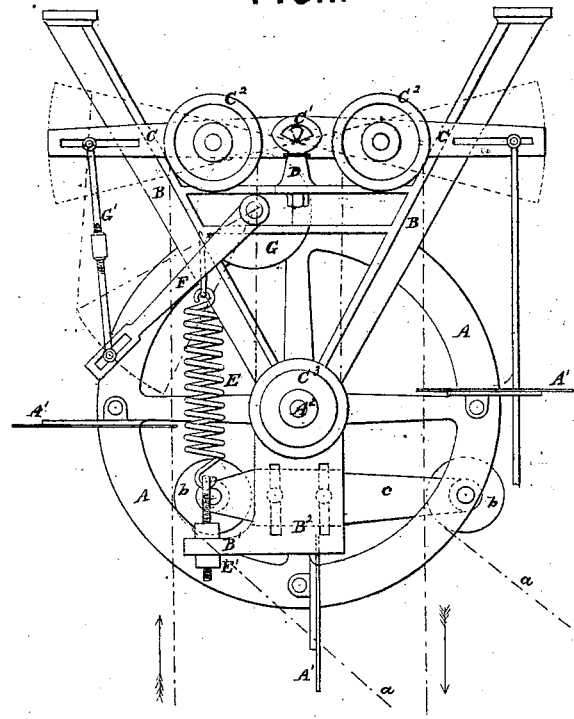
Figure 1 is a front elevation of a governor for a marine-engine constructed according to my invention.
Figure 2:
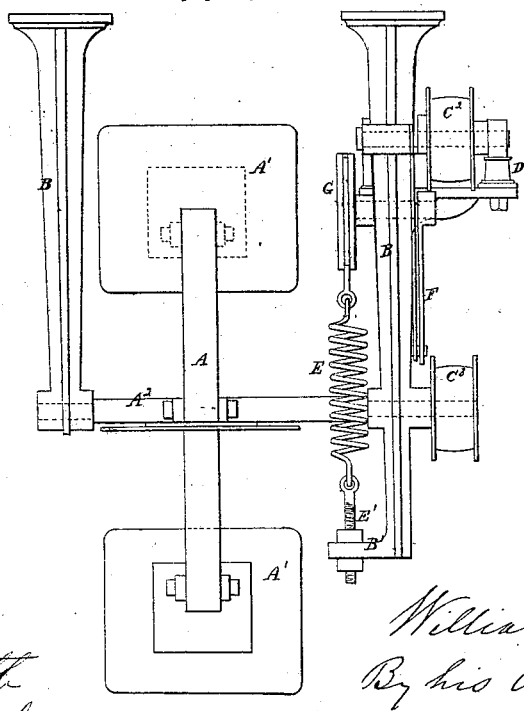
Fig. 2 is an end elevation of the said governor.

In the arrangement of my said invention, illustrated in Figs. 1, 2, and 2$^a$, A is a balance-vane wheel with vanes A$^1$, and fixed on a shaft, A$^2$, that turns in bearings in two hanging brackets, B. C is the vibrating beam, resting on steel centers C$^1$, with knife-edges, and provided with carrying-pulleys C$^2$, from which the band passes to the driving-pulley C$^3$ on the wheel-shaft A$^2$. The pulleys C$^2$ are fixed on short journals that run freely in bearings formed in the vibrating beam. The centers of the said beam are supported by two small pillars, D, with V-shaped openings in the top to permit the free oscillation of the knife-edged centers or fulcrum-pins C$^1$. E is the counteracting-spring. F is the compensating-link for equalizing the force of the spring. This link is fixed on one end of a short shaft or journal, fitted to turn freely in a boss formed on one of the brackets B. On the other end of the short shaft is fixed a wheel, G, which is connected to the spring E by a chain or other like means. The link F is connected to the vibrating beam C by a rod, G$'$, whose length is adjustable by a coupling-screw or other means to regulate the amount of compensation. By referring to Fig. 1 it will be seen that the lever F is so arranged that the movement of the beam C on its centers will so change the angular position of the said lever as to compensate for the increased or diminished tension of the spring E. By lengthening or shortening the rod G$'$, or by moving the rod in the slot in the beam C and link F, the tension of the spring can be regulated to let the engine run at any required speed; or the tension of the spring may be regulated by means of the nuts E$'$, which secure the lower end of the spring to the arm B$^1$. The dotted lines $a$ indicate the direction of the band or belt from the engine-shaft, the said band being passed over two carrying-pulleys, $b$, fixed on journals that turn in bearings in the adjustable bracket $c$, secured on the bracket B$^2$ by bolts passed through slots in both brackets, which slots permit the adjustment of the bracket $c$ up or down or to either side, according to the direction of the band. By this means of adjustment I can also tighten the band when necessary. In the modification of my invention shown in Figs. 3 and 4 the balance-wheel A, with the vanes A$^1$, is fixed on a vertical spindle, A$^2$; the driving-pulley C$^3$ is fixed on the lower end of the said spindle. In this arrangement the vibrating beam has one of the carrying-pulleys on one side and the other pulley on the other side, and the driving-belt $a$ has a half twist from these pulleys to the driving-pulley C$^3$, as shown by the dotted lines, Fig. 3. B* is the stand that supports the governor, with the base made open for the passage of the said driving-band. D D are the arms or pillars for supporting the beam C, whose fulcrum is fitted with knife-edged pieces C$^1$, as before described. H is a shaft that carries an arm, H$'$. This arm is connected to the beam C by the link I. J is the arm carrying the weight or counter-balance J$'$; and K is the arm connected to the rod K$'$, which connects the governor to the throttle-valve $d$. L is the safety-check link. L$'$ is the spring, which is attached to the link at L*; it is also attached to the sliding part M of the rod at M$'$. L$^2$ is the pawl that locks the sliding part M of the rod. N is the pin or bolt that disengages the pawl from the said sliding part M. If the governor should be disconnected or stopped the weight J will cause the rod to move forward and open the valve till the pawl strikes the stop N, which immediately liberates the spring and closes the valve. By this means I prevent the escape of the engine from the control of the governor in case of any accident to the latter or its connections.

In Fig. 5 I have shown an arrangement of the vanes of the balance-wheel, wherein the said vanes turn on studs or bolts, $e$, on which they can be set to any angle and secured by a nut or other fastening. In Fig. 6 I have shown my improved compensating-vanes with light balls $f$, that operate against springs $g$ on the arms of the balance-wheel A, and therefore open and close the vanes according to the speed of the engine.

I claim as my invention—

1. In a governor for steam and other engines, the balance-wheel A with the vanes $A^1$, arranged to operate in combination with the belt $a$, passing over a pulley, $C^3$, on the vane-wheel shaft, and pulleys $C^2$ on the vibrating beam C, which is connected to the throttle-valve and to a spring or weight, substantially as set forth, and for the purpose specified.

2. The link or lever F, secured to the spring E, and connected to the vibrating lever C by the adjusting-rod G for equalizing the tension of said spring, and the combination with the lever F of the adjusting-screw, substantially as herein set forth.

3. The combination, with the vanes $A^1$, of the balls $f$ and springs $g$, substantially as and for the purpose herein set forth.

4. The combination of the pulleys $b$, the adjustable bracket $B^2$, and the lever $c$ with each other and with the pulleys $C^2$ and the vibrating beam C, substantially as and for the purpose herein set forth.

5. The link L, spring $L^1$, and pawl $L^2$, in combination with the two parts of the valve-rod and with the pin or bolt N, substantially as set forth, and for the purpose specified.

WILLIAM CLARK.

Witnesses:
   W. J. LOWE,
   E. C. JACKSON.